Figure 1:
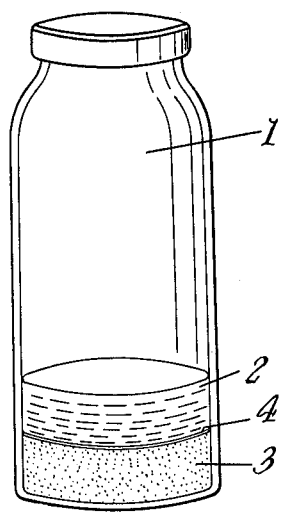

March 15, 1966  A. MATTEUZZI  3,240,328
METHOD FOR KEEPING MUTUALLY INCOMPATIBLE SUBSTANCES
WITHIN THE SAME CONTAINER
Filed Nov. 7, 1963

United States Patent Office

3,240,328
Patented Mar. 15, 1966

3,240,328
METHOD FOR KEEPING MUTUALLY INCOMPATIBLE SUBSTANCES WITHIN THE SAME CONTAINER
Amedeo Matteuzzi, Bologna, Italy, assignor to Ghimas S.a.r.l., Bologna, Italy, an Italian body corporate
Filed Nov. 7, 1963, Ser. No. 322,198
Claims priority, application Italy, Nov. 26, 1962, 23,274/62
4 Claims. (Cl. 206—47)

The present invention relates to a method and an arrangement apt to allow two or more mutually incompatible products to be preserved and kept within the same container until such time as they may be put to use.

It is known that owing to their mutual incompatibility, many products cannot be intermixed until and except at the time they are used, and it is well known moreover that there are substances such as for example products of the chemical and foodstuffs industry which are perishable or subject to spoiling. Although single substances may be kept without spoiling by means of various processes employed at present, the problem involved acquires greater complexity if two or more mutually incompatible products are to be placed within a single container in predetermined amounts. Among innumerable instances, there may be recalled as an example the case of keeping fruit juice and a definite quantity of sodium bicarbonate within the same container. The action of the latter, which causes the beverages to become effervescent, should not occur until the beverage is about to be consumed, which imposes the need for the two substances to remain separate and unspoiled indefinitely within the same container. Analogously, definite quantities of milk and of coffee may thus be preserved, after being subjected to appropriate processing in consecutive stages, in such manner that no mixing or spoiling is observed prior to consumption. The examples and instances in which analogous procedures are of interest in the most varied branches of industry may arise in great number, notwithstanding the fact that reference has been made to beverages in particular.

The present invention consists in a method of the kind referred to, whereby at least two products placed within a container and appropriately processed in consecutive stages, are disposed along the longitudinal axis of a container which latter is held in the horizontal position during the processing sequences, so that the products in question are separated and isolated from each other in any event by an empty space, and in any case in the absence of any separating substance which is solid or may be solidified.

Another purpose of the present invention is to obtain a greatly increased surface of evaporation for the substances by means of dispositions of this nature, which appreciably reduces operating periods and thus costs, thereby increasing the low efficiency of certain processes.

Yet another purpose is to allow, by virtue of a disposition of this nature of the products, the latter to be frozen at higher temperatures such as —30° C. for example, rather than —60° C., since the risk of the surfaces of these products being mixed is eliminated, thereby further improving the results of the method in respect of technology as well as of economy.

The present invention will be further described with reference to the accompanying drawings, by way of example and in no way of limitation.

Figure 2:
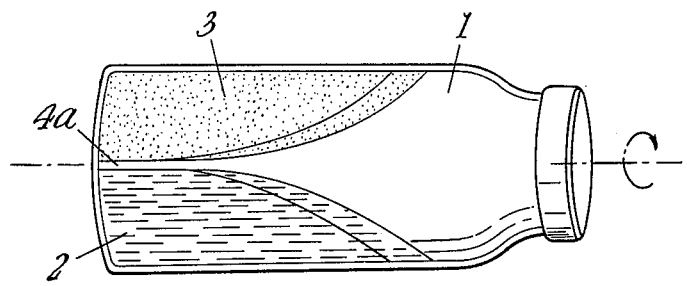

FIGURE 1 is a perspective view of a container having layers of two different substances therein, FIGURE 2 is a similar view of the same container which has been filled in accordance with the invention.

A particular disposition of substances which has been previously tried, is shown in FIGURE 1. The different substances 2 and 3 which are to be preserved, are placed within a container 1 with an inert layer 4 between them. The need for this layer is established by virtue of the fact that the surfaces of the two substances would tend to intermingle if in direct contact, thus resulting in disadvantages which are in point of fact to be prevented. The thin separating layer very frequently proves to be inoperative or inadequate however and to make the same thicker would mean adding a foreign substance to the products in question in appreciable quantity and performing an avoidable operation.

As apparent from FIGURE 2, the container 1 is placed in the horizontal position. A substance 3 e.g. a powder is introduced therein, for example by means of a tube inserted in the container, and assumes a shell-like shape in the lower part of the vessel. After this substance has been processed appropriately to secure it in position, the container is made to turn through 180° around its longitudinal axis. The substance 3 adheres to the container within the part now uppermost, and the other substance 2 is then inserted therein and made to undergo the next stage of processing.

A clear space 4a is obtained in this manner between the parts of the two solidified substances which are closest to each other. The result thereof is that points of contact no longer exist between the substances in question.

As apparent moreover, their surfaces are substantially greater than those which would result from a vertical disposition such as shown in FIGURE 1.

The periods and costs of the freezing and/or other operations are reduced as a result of the increased surfaces of evaporation. There is thus no need to employ a third substance as a separator, so that a further reduction in production costs is obtained.

Although two substances were specified by way of example, the container being turned through 180°, the method is evidently also applicable in the case of three substances, the container being turned through 120° for each stage, or by the appropriate angle in the case of four or more substances, depending on requirements.

If necessary filling and processing may be effected simultaneously or in a series of alternate consecutive steps and if necessary the container may be suitably tilted during the filling operation.

I claim:
1. A method of packaging a plurality of mutually incompatible substances in a single hollow container having an end wall, a side wall, an open end opposite said end wall, and free from internal partitions and for retaining said substances out of contact within said container, said method comprising the steps of disposing said container in a horizontal position, introducing a first fluent substance into said container through said open end to a level less than the transverse dimension of said container, solidifying said first substance to adhere the same to the side wall of the container and prevent flow thereof, rotating said container about a horizontal axis to dispose said first substance above the lower empty portion of the container, introducing a second fluent substance mutually incompatible with said first substance into said container through said open end to a level below the lowermost part of said first substance, solidifying said second substance to adhere the same to the side wall of said container and prevent flow thereof, the volume of each of said substances constituting a substantial portion of the volume of said container, and closing the open end of said container, whereby said substances are retained out of contact in any position of said container.

2. A package comprising a hollow container having an end wall, a side wall, an open end opposite said end wall, and a removable closure for said open end, a first solidified substance adhered to said side wall and extending transversely of said container a distance less than the transverse dimension of said container, and a second solidified substance mutually incompatible with said first substance, said second substance being adhered to said side wall in spaced relation and free from contact with said first substance, the volume of each of said substances constituting a substantial portion of the volume of said container, whereby said mutually incompatible substances are retained in said container in a manner to prevent mixing or contact therebetween.

3. A method as claimed in claim 1, in which the container is rotated through 180° between the steps of introducing the first and second substances respectively.

4. A method as cliamed in claim 1, in which the container is rotated through 120° between the steps of introducing the first and second substances respectively and in which the container is rotated through a further 120° before a third substance is introduced in the container and is solidified to fix the same in position in the container.

References Cited by the Examiner

UNITED STATES PATENTS

| | | | |
|---|---|---|---|
| 527,736 | 10/1894 | Stone | 117—95 |
| 1,306,375 | 6/1919 | Hadfield et al. | 117—95 |
| 1,937,402 | 11/1933 | Cherry | 206—65 |
| 1,989,926 | 2/1935 | Hoover et al. | 117—95 X |
| 2,421,975 | 6/1947 | Williams | 117—97 X |
| 2,667,422 | 1/1954 | Kauffman | 99—171 |
| 2,862,616 | 12/1958 | Capozzi et al. | 206—47 |
| 2,936,884 | 5/1960 | Marsh et al. | 206—84 |
| 2,980,540 | 4/1961 | Turpin | 206—47 |
| 2,982,396 | 5/1961 | Shihodeh | 206—47 |
| 3,141,990 | 7/1964 | Ray | 117—97 X |

THERON E. CONDON, *Primary Examiner.*

GEORGE O. RALSTON, *Examiner.*

J. M. CASKIE, *Assistant Examiner.*